(12) United States Patent
Keeper et al.

(10) Patent No.: US 8,490,945 B2
(45) Date of Patent: Jul. 23, 2013

(54) VALVE SEALING ARRANGEMENTS AND METHODS

(75) Inventors: Branden W. Keeper, Mentor, OH (US); William H. Glime, Chagrin Falls, OH (US)

(73) Assignee: Swagelok Company, Solon, OH (US)

( * ) Notice: Subject to any disclaimer, the term of this patent is extended or adjusted under 35 U.S.C. 154(b) by 848 days.

(21) Appl. No.: 12/578,047

(22) Filed: Oct. 13, 2009

(65) Prior Publication Data
US 2010/0090146 A1  Apr. 15, 2010

Related U.S. Application Data

(60) Provisional application No. 61/104,808, filed on Oct. 13, 2008.

(51) Int. Cl.
*F16K 25/00* (2006.01)

(52) U.S. Cl.
USPC ......... 251/172; 251/174; 251/315.1; 251/314

(58) Field of Classification Search
USPC .................. 251/314, 174, 315.01, 315.1, 172
See application file for complete search history.

(56) References Cited

U.S. PATENT DOCUMENTS

| | | | |
|---|---|---|---|
| 2,383,983 A | 9/1945 | Melichar | |
| 2,558,260 A | 6/1951 | Maky | |
| 2,628,060 A | 2/1953 | Parker | |
| 2,661,926 A | 12/1953 | Resek | |
| 2,796,230 A | 6/1957 | Grove et al. | |
| 3,173,647 A | 3/1965 | Bryant | |
| 3,266,769 A | 8/1966 | Shand | |
| 3,379,410 A | 4/1968 | Stewart, Jr. | |
| 3,472,270 A | 10/1969 | Masheder | |
| 3,605,789 A | 9/1971 | Graham | |
| 3,667,727 A | 6/1972 | Bowden | |
| 3,765,440 A * | 10/1973 | Grove et al. | ............... 251/172 |
| 3,794,291 A | 2/1974 | Suyama | |

(Continued)

FOREIGN PATENT DOCUMENTS

| | | |
|---|---|---|
| BE | 507775 | 12/1951 |
| FR | 658229 | 7/1928 |

OTHER PUBLICATIONS

International Search Report and Written Opinion from PCT/US09/60456 dated Feb. 9, 2010.

*Primary Examiner* — John Bastianelli
(74) *Attorney, Agent, or Firm* — Calfee, Halter & Griswold LLP

(57) ABSTRACT

A valve includes a valve body, a valve element to selectively control flow through the valve, and a seal member and seat member together providing a fluid-tight seal between a valve cavity and a fluid passage in the valve body. A live-loaded biasing member is adapted to apply a live-loaded sealing force to the seat member to bias the seat member toward sealing engagement with the valve element. When the pressure in the fluid passage exceeds the pressure in the valve cavity, an unbalanced passage pressure load biases the seat member toward sealing engagement with the valve element. When the pressure in the valve cavity exceeds the pressure in the fluid passage, an unbalanced cavity pressure load biases the seat member toward sealing engagement with the valve element. The live-loaded sealing force is in parallel with each of the unbalanced passage pressure load and the unbalanced cavity pressure load.

8 Claims, 12 Drawing Sheets

U.S. PATENT DOCUMENTS

| | | |
|---|---|---|
| 4,113,229 A | 9/1978 | Fujiwara |
| 4,151,855 A | 5/1979 | Levin et al. |
| 4,266,566 A * | 5/1981 | Kacal et al. .................. 251/174 |
| 4,479,513 A | 10/1984 | Koch et al. |
| 4,572,239 A | 2/1986 | Koch et al. |
| 4,718,444 A * | 1/1988 | Boelte .......................... 251/174 |

* cited by examiner

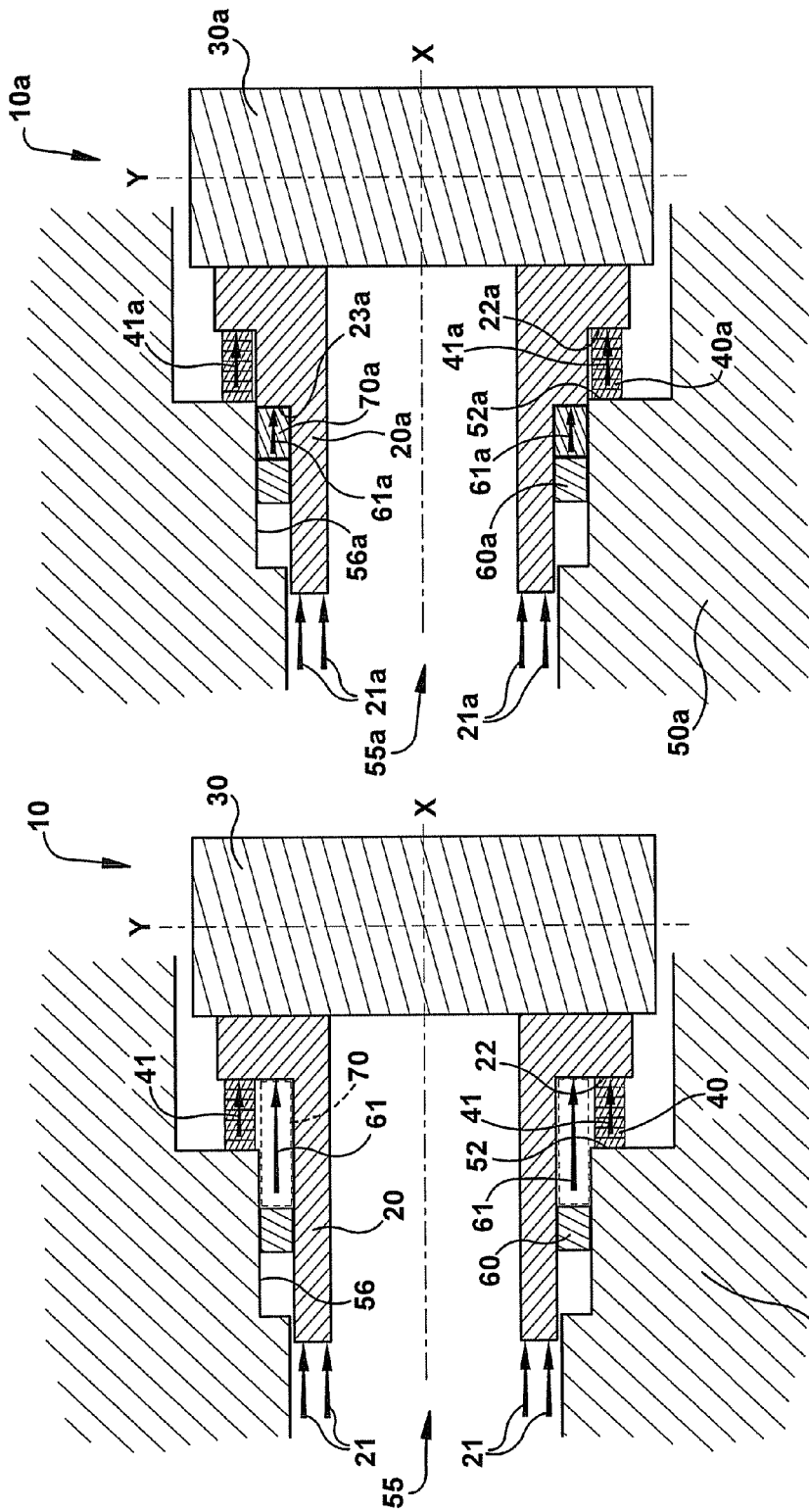

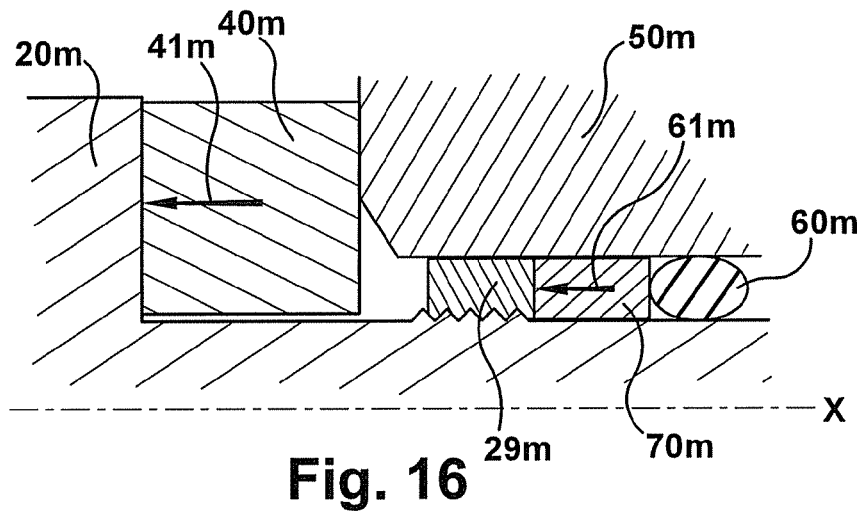
Fig. 16
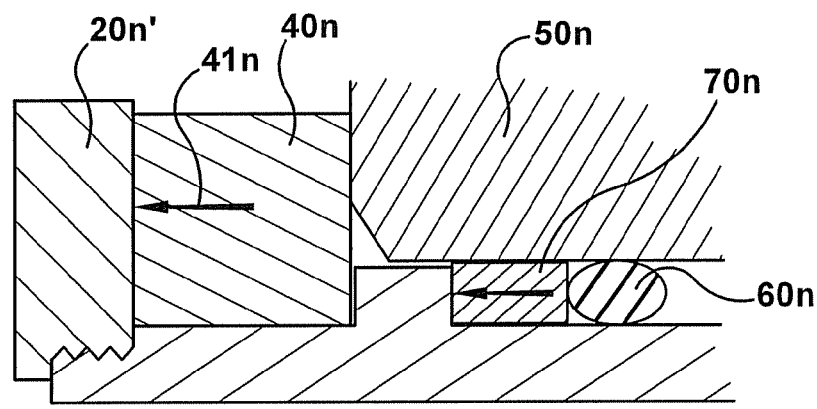
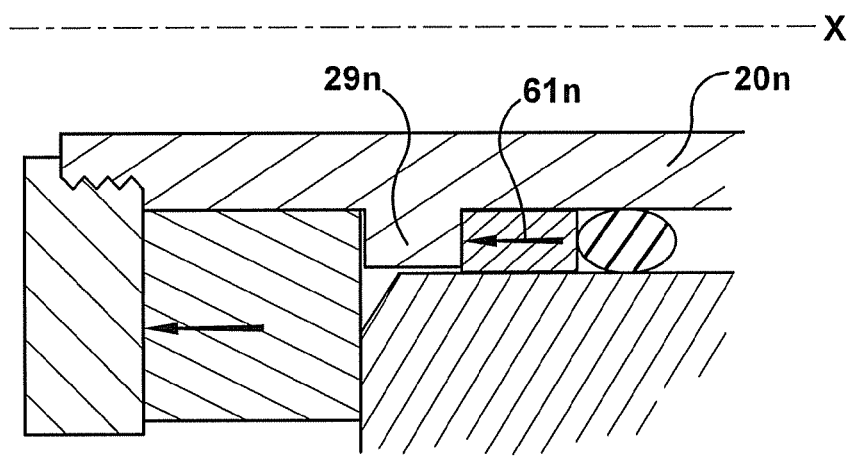
Fig. 17

US 8,490,945 B2

VALVE SEALING ARRANGEMENTS AND METHODS

CROSS-REFERENCE TO RELATED APPLICATION

This application claims the benefit of pending U.S. provisional application Ser. No. 61/104,808 filed on Oct. 13, 2008, entitled VALVE SEALING ARRANGEMENTS AND METHODS, the entire disclosure of which is fully incorporated herein by reference.

BACKGROUND OF THE DISCLOSURE

Valves are often used to control fluid flow through a fluid system, for example, by shutting off, regulating, or redirecting flow applied to an inlet fluid passage of the valve. In many valves, a valve element is selectively movable to block, meter, divert, or otherwise control fluid flow, for example, to another passage of the valve, such as an outlet passage. Such a valve element may be placed in sealing engagement with one or more valve seat members, to limit or prevent leakage of system fluid past the valve element. Valve elements may be movable in a variety of different ways with respect to the seat member, including, for example, axial movement of the valve element towards and away from the seat member, sliding movement through the seat member, or rotational movement with respect to the seat member. As one example, a rotatable valve element may be provided with a through passage, such that when the valve element is rotated to align the through passage with an inlet passage of the valve, flow of fluid through the valve seat and the valve element passage (for example, to a second, outlet valve passage) is permitted. When the rotatable valve element is rotated to move the through passage out of alignment with the valve inlet passage (i.e., a valve closed position), fluid flow is blocked, and the valve seat provides sealing engagement with the valve element to reduce or prevent leakage past the valve element. One example of such a valve is a ball valve, provided with a spherical outer surface against which a complementary shaped spherical surface of the valve seat is configured to seal.

One such ball valve is described in U.S. Pat. No. 4,113,229 (the "'229 patent"), the disclosure of which is incorporated herein by reference in its entirety. In the valve described in the '229 patent, a spring member biases a valve seat towards sealing engagement with a valve element or ball, to provide a seal between the ball and seat member at lower pressures. In response to fluid pressure, the seat member axially moves or "floats" within the valve body. By exposing the upstream system fluid to outward facing seat member surfaces having a surface area that exceeds the surface area of inward facing seat member surfaces, the fluid pressure acts against a net effective area to force or urge the valve seat into tighter sealing engagement with the ball.

However, it may be desirable to limit these fluid pressure sealing forces applied to the floating seat member by the pressurized system fluid, for example, to reduce seat wear or to reduce the operating force required to operate the valve element. In one embodiment, the sealing forces may be limited by reducing the net effective area upon which the upstream fluid pressure may act. As one example, an axially movable seat member may include a seat carrier having a reduced diameter outer or tail portion to which the upstream or inlet system pressure is exposed, such that the net effective area (the amount by which the outward facing pressurized surfaces exceed the inward facing pressurized surfaces) is limited or reduced, thus limiting the upstream pressure sealing forces applied to the seat. One way of reducing this net effective area is by isolating the spring member, and the outward facing surface against which the spring member acts, from the upstream fluid pressure. An example of such a valve arrangement is described in U.S. Pat. No. 4,572,239 (the "'239 patent"), the disclosure of which is incorporated herein by reference in its entirety.

As shown in FIG. 1, the valve of the '239 patent includes live-loaded members or spring members (disc springs 110', 112', 114') that bias the valve seat (seat carrier C' with seat ring 120') towards sealing engagement with a trunnion-style valve element (closure member B') disposed in a central passageway 20' of the valve body A'. The disc springs 110', 112', 114' are in a valve cavity sealed from inlet system fluid pressure (applied to end fitting D') by an o-ring seal 100' that provides a seal between the seat carrier C' and the inlet passage (of end fitting D'). As such, the fluid pressure sealing force is limited to the surface area difference between the outward facing surfaces of the seat carrier C' tail portion and the o-ring seal 100', and the inward facing surfaces of the seat carrier that are radially inward of the sealing portion of the seat ring 120'. As described in greater detail in the '239 patent, by positioning the seat ring sealing portion radially inward of the seal chamber surface (or outer diameter of the o-ring 100'), the net effective area ensures an inward urging of the seat carrier C' due to upstream system pressures. This inward urging is transmitted through the o-ring 100', as upstream fluid pressure forces the o-ring seal 100', backup ring 104', and gland 106' against disc springs 110', 112', 114', thereby forcing the disc springs and seat carrier C' towards sealing engagement with the closure member B'. As a result, a system pressure-assisted sealing force is applied in series with the live-loaded sealing force of the disc springs 110', 112', 114'.

FIG. 1A graphically illustrates upstream sealing load between a valve seat and a valve element (e.g., a ball) as a function of differential system pressure in a valve in which a fluid-driven sealing force is in series with a spring-loaded or live-loaded sealing force. Line 1a indicates sealing load provided by the system pressure, and line 2a identifies additional sealing load (represented by the displacement between lines 1a and 2a) provided by the live-loaded sealing force (e.g., by one or more spring members). As shown, at lower system pressures, sealing load is predominantly provided by the live-loaded sealing force. However, as the system pressure increases, the resulting fluid-driven sealing force predominates the total sealing load (e.g., as live-loaded spring members are further compressed and exert a reactive load against the fluid driven sealing force). When the system pressure exceeds an amount sufficient to fully compress the source of the live-loaded sealing force (at the intersection of lines 1a and 2a), sealing load is exclusively provided by the fluid-driven system pressure.

As further described in the '239 patent, to provide suitable sealing forces between the seat ring 120' and the closure member B' against downstream system pressures, the sealing portion of the seat ring 120' is also configured to have an outside diameter that is greater than the outside diameter of the carrier tail portion 62' (or the inside diameter of the o-ring seal 100' surrounding the tail portion), such that the net effective area which provides the net force of downstream fluid pressure acting on the seat ring 120' comprises the annulus defined between the outer diameter of sealing contact by the downstream seat ring engaging surface with the ball portion and the outer diameter of the associated carrier tail portion 62'. As a result, the fluid pressure within the valve cavity provides a system pressure assisted sealing force on the downstream seat toward sealing engagement with the valve element. This sealing force is applied in parallel with the downstream disc springs 110', 112', 114'.

FIG. 1B graphically illustrates upstream sealing load between a valve seat and a valve element (e.g., a ported ball or plug) as a function of differential system pressure in a valve in which a fluid-driven sealing force is applied in parallel with a spring-loaded or live-loaded sealing force. Line 1*b* indicates sealing load provided by the system pressure, and line 2*b* identifies additional sealing load (represented by the displacement between lines 1*b* and 2*b*) provided by the live-loaded sealing force (e.g., by one or more spring members). As shown, at lower system pressures, sealing load is predominantly provided by the live-loaded sealing force. However, unlike the sealing load performance illustrated in FIG. 1A, as the system pressure increases, the live-loaded sealing force remains relatively constant, thereby providing an increased sealing load (as compared to the sealing load performance illustrated in FIG. 1A), particularly at higher system pressures.

SUMMARY

The present application contemplates valve sealing arrangements and methods that effect a seal between a valve seat member and a valve element, to seal against fluid introduced to the valve through a fluid passage of the valve body. In one embodiment, a valve sealing arrangement applies a first or fluid-driven sealing force, resulting from unbalanced pressure within the valve, and a second or live-loaded sealing force, each for biasing a valve seat member towards sealing engagement with a valve element. As used herein, "live-loaded" includes any condition of stored mechanical energy, including, but not limited to, a partially or fully compressed spring member or other such biasing member.

In one embodiment, a valve includes a valve cavity, which receives the valve element, and a fluid passage, which receives fluid for passage through the valve. A fluid tight seal may be provided between the valve cavity and the fluid passage, for example, by sealing engagement between the valve element and seat member, and between the seat member and the valve body (for example, using a seal member, such as an o-ring seal). The valve may be adapted such that when the fluid pressure in the fluid passage exceeds the fluid pressure in the valve cavity, an unbalanced passage pressure load (resulting from outward facing seat member surfaces exceeding inward facing seat member surfaces within the fluid passage) exerts a fluid driven or pressure assisted sealing force to bias the valve seat into sealing engagement with the valve element. The valve may be further adapted such that when the fluid pressure in the valve cavity exceeds the fluid pressure in the fluid passage, an unbalanced cavity pressure load (resulting from outward facing seat member surfaces exceeding inward facing seat member surfaces within the valve cavity) exerts a fluid driven or pressure assisted sealing force to bias the valve seat into sealing engagement with the valve element.

According to an inventive aspect of the present application, a valve may be adapted such that a fluid-driven sealing force is in parallel with, or acts independent of, a live-loaded sealing force, such that an increase in either the unbalanced passage pressure load or the unbalanced cavity pressure load does not diminish the contribution of the live-loaded sealing force.

As such, in one embodiment, a valve includes a valve body, a valve element to selectively control flow through the valve, and a seal member and seat member together providing a fluid-tight seal between a valve cavity and a fluid passage in the valve body. A live-loaded biasing member is adapted to apply a live-loaded sealing force to the seat member to bias the seat member toward sealing engagement with the valve element. When the pressure in the fluid passage exceeds the pressure in the valve cavity, an unbalanced passage pressure load biases the seat member toward sealing engagement with the valve element. When the pressure in the valve cavity exceeds the pressure in the fluid passage, an unbalanced cavity pressure load biases the seat member toward sealing engagement with the valve element. The live-loaded sealing force is in parallel with each of the unbalanced passage pressure load and the unbalanced cavity pressure load.

In another embodiment, a valve includes a valve body having a valve cavity and a fluid passage, a valve element at least partially disposed in the valve cavity to selectively control flow through the fluid passage, and a seat member at least partially disposed in the fluid passage, the seat member being axially movable along the fluid passage to seal against a sealing surface of the valve element. A seal member is radially disposed between the seat member and the valve body, and a force transmitting member is axially disposed between the seal member and the seat member. The force transmitting member is adapted to transmit a first sealing force from the seal member to a first bearing surface on the seat member in response to pressurized fluid applied to the fluid passage to axially bias the seat member towards sealing engagement with the valve element. A live-loaded biasing member is configured to apply a second sealing force to a second bearing surface on the seat member separate from the first bearing surface, to axially bias the seat member towards sealing engagement with the valve element.

In still another embodiment, a valve includes a valve body having a valve cavity and a fluid passage, a valve element at least partially disposed in the valve cavity to selectively control flow through the fluid passage, and a seat member at least partially disposed in the fluid passage. The seat member includes a proximal head portion fixedly retaining a seat ring for sealing against a sealing surface of the valve element, a medial shoulder portion stepped down from the head portion, and a distal tail portion stepped down from the shoulder portion. A seal member is radially disposed between the tail portion and the valve body, and a force transmitting member is retained on the tail portion between the seal member and the shoulder portion. The force transmitting member is adapted to transmit a fluid-driven sealing force from the seal member to an axially outer face of the shoulder portion in response to pressurized fluid applied to the fluid passage to axially bias the seat member towards sealing engagement with the valve element. A live-loaded biasing member is retained on the shoulder portion and compressed between an axially inner face of the valve body and an axially outer face of the head portion to apply a live-loaded sealing force to the seat member independent of the fluid-driven sealing force, to bias the seat member toward sealing engagement with the valve element.

Further advantages and benefits will become apparent to those skilled in the art after considering the following description and appended claims in conjunction with the accompanying drawings.

BRIEF DESCRIPTION OF THE DRAWINGS

FIG. 2A is a partial cross-sectional schematic view of a valve having a seat member biased towards sealing engagement with a valve element;

FIG. 2B is a partial cross-sectional schematic view of a valve having a live-loaded biasing member and a fluid-driven force transmitting member for applying sealing forces to axially and radially spaced surfaces of a seat member;

FIG. 16 is a partial cross-sectional schematic view of a valve sealing arrangement having a fluid-driven force transmitting member and a threaded flange member assembled with a seat member;

FIG. 17 is a partial cross-sectional schematic view of a valve sealing arrangement having a fluid-driven force transmitting member and a threaded sealing portion assembled with a seat member;

DETAILED DESCRIPTION

Figure 1:
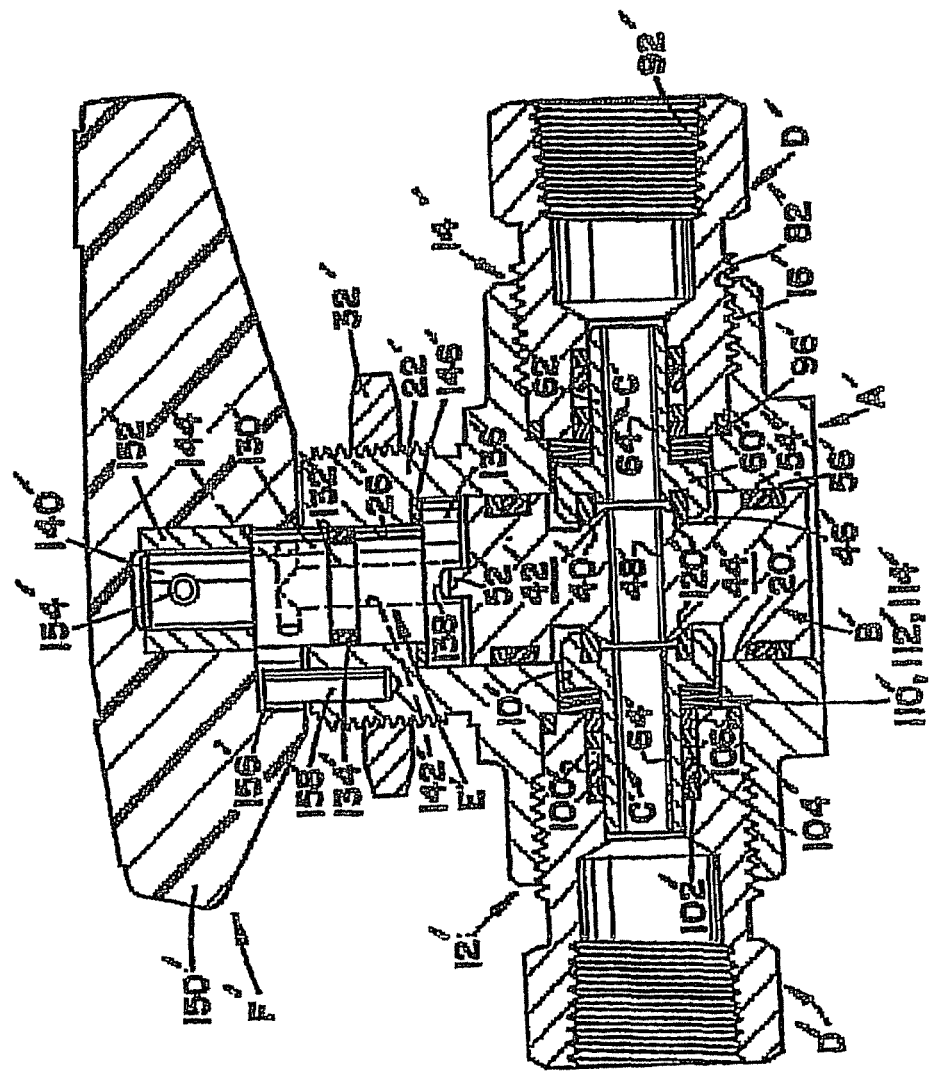
FIG. 1 is a cross-sectional view of a conventional prior art ball valve.
Figure 1A:
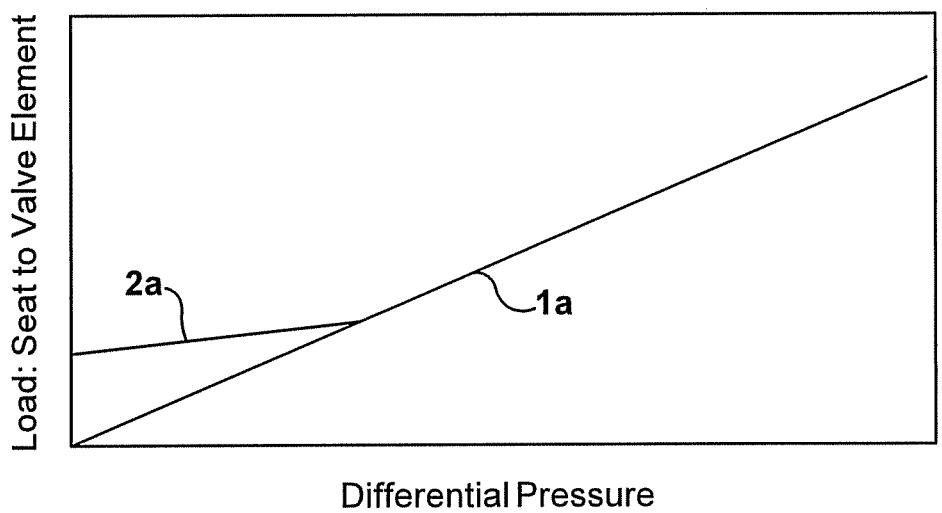
FIG. 1A graphically illustrates sealing load performance in a valve in which a fluid-driven sealing force is in series with a live-loaded sealing force.
Figure 1B:
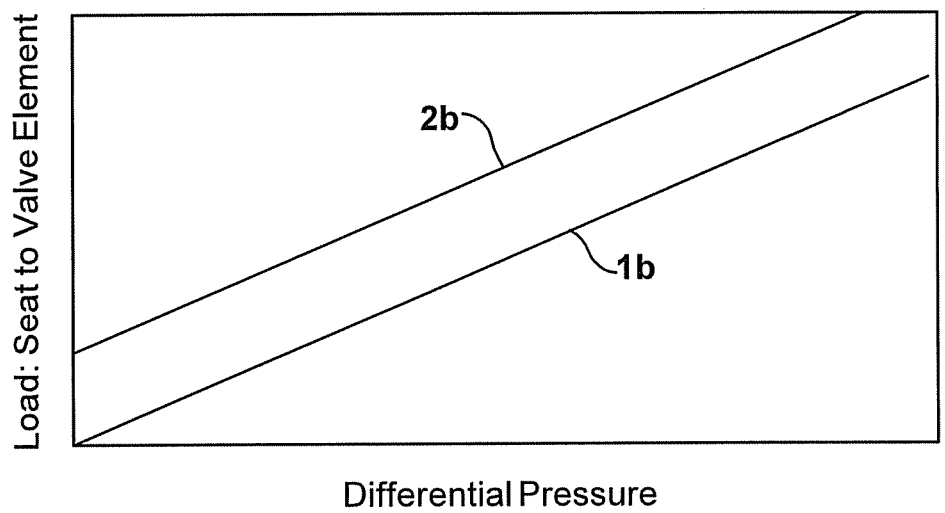
FIG. 1B graphically illustrates sealing load performance in a valve in which a fluid-driven sealing force is in parallel with a live-loaded sealing force.

The present application relates to sealing arrangements that may be used with many types of valves, such as, for example, ball valves. While the sealing arrangements described herein are described as used with rotary ball valves (such as, for example, a quarter-turn shutoff ball valve), the inventive sealing arrangements described herein may be used with many different types of valves, including, for example, plug valves and gate valves, and with valves configured to perform many different functions, including, for example, switching and regulating valves. In one embodiment, a valve includes a movable valve element, operable to control the flow of fluid directed into the valve, and a valve seat member, configured to seal against the valve element to limit or prevent fluid leakage around or past the valve element.

According to an inventive aspect of the present application, a valve sealing arrangement may be configured to apply, to a valve seat member, an unbalanced passage pressure load when the pressure in the fluid passage exceeds the pressure in the valve cavity, and an unbalanced cavity pressure load when the pressure in the valve cavity exceeds the pressure in the fluid passage. A live-loaded sealing force is applied to the valve seat member such that the fluid-driven sealing force is in parallel with, or is applied to the valve seat member independent of, the live-loaded sealing force. As a result, unbalanced pressure loads and live-loaded sealing forces against the seat member are additive, resulting in greater sealing forces between the seat member and the valve element.

Parallel sealing forces may result from unbalanced pressure loads and live-loaded sealing forces acting on the same valve seat surface, for example, as shown in the downstream seat assembly of the '239 patent and described in greater detail above. Additionally or alternatively, as described in inventive embodiments of the present application, parallel pressure loads and live-loaded sealing forces may be provided by isolating the live-loaded sealing force from the unbalanced system pressure load, for example, by applying the live-loaded sealing forces to a first bearing surface that is separate from a second bearing surface upon which the unbalanced system pressure loads act.

FIG. 2A schematically illustrates a partial cross-sectional view of an upstream or inlet side of an exemplary valve 10 including a seat member 20 axially movable within a fluid passage 55 (i.e., along central axis X of fluid passage 55) of a valve body 50 for sealing engagement against a valve element 30, shown in a closed or shut-off position. The valve 10 may, but need not, be symmetrical with respect to a central axis Y of the valve element 30, such that a downstream portion substantially matches the upstream portion of the valve shown in the partial view of FIG. 2A. The seat member 20 may be biased against the valve element 30 by a live-loaded biasing member 40, which is disposed between a radially extending surface 52 of the valve body 50 and a radially extending bearing surface 22 of the seat member 20. The illustrated live-loaded biasing member 40 exerts a live-loaded sealing force (represented by arrows 41) directly against the bearing surface 22 to move or bias the seat member 20 towards sealing engagement with the valve element 30. In other embodiments, this live-loaded sealing force may be applied to the seat member through an intermediate component (not shown), such as, for example, a gland, gasket, or other such component.

In the illustrated embodiment of FIG. 2A, an annular seal member 60 is radially disposed between the seat member 20 and an internal surface 56 of the inlet fluid passage 55. In one embodiment, the seal member may provide a seal between the seat member 20 and the valve body 50, such that pressurized fluid introduced into the fluid passage 55 does not apply a sealing force directly against the bearing surface 22 upon which the live-loaded biasing member is acting. Instead, in this embodiment, a direct fluid sealing force (represented by arrows 21) against the seat member 20 is limited to a radially extending bearing surface 25 upstream of the seal member.

While a fluid-driven force may be applied directly by a seal member against a seat member, in other embodiments, as shown in phantom in FIG. 2A, a fluid-driven force transmitting member 70 may be included, such that axial movement of the seal member 60 may result in a fluid-driven force (represented at arrows 61) applied to the seat member 20 at or through the force transmitting member 70. As shown, the valve may be configured such that the force transmitting member 70 does not transmit the fluid-driven force 61 against or through the live-loaded biasing member 40, such that the fluid-driven force 61 is isolated from the live-loaded sealing force 41, resulting in additive sealing forces for sealing the seat member 20 against the valve element 30.

Many different configurations may be utilized to transmit or apply a fluid-driven force from a seal member (such as a sealing element) to a seat member while isolating the fluid-driven force from a live-loaded biasing member. In one embodiment, a fluid-driven force transmitting member may be configured to transmit a fluid-driven force from a seal member to a seat member bearing surface that is axially spaced or offset from the bearing surface against which the live-loaded sealing force is applied, thereby allowing the fluid-driven force and the live-loaded sealing force to act against the seat member independently. As shown in FIG. 2B, a valve 10a may be provided with an annular gland member 70a disposed axially between the seal member 60a and the seat member 20a, and radially between the seat member 20a and an internal surface 56a of the fluid passage 55a. In this embodiment, the fluid-driven force transmitting member 70a transmits the fluid-driven force 61a from the seal member 60a to a second radially extending bearing surface 23a on the seat member 20a, located on a shoulder 29a that is radially inward of, and axially spaced from, the first bearing surface 22a.

Figure 3:
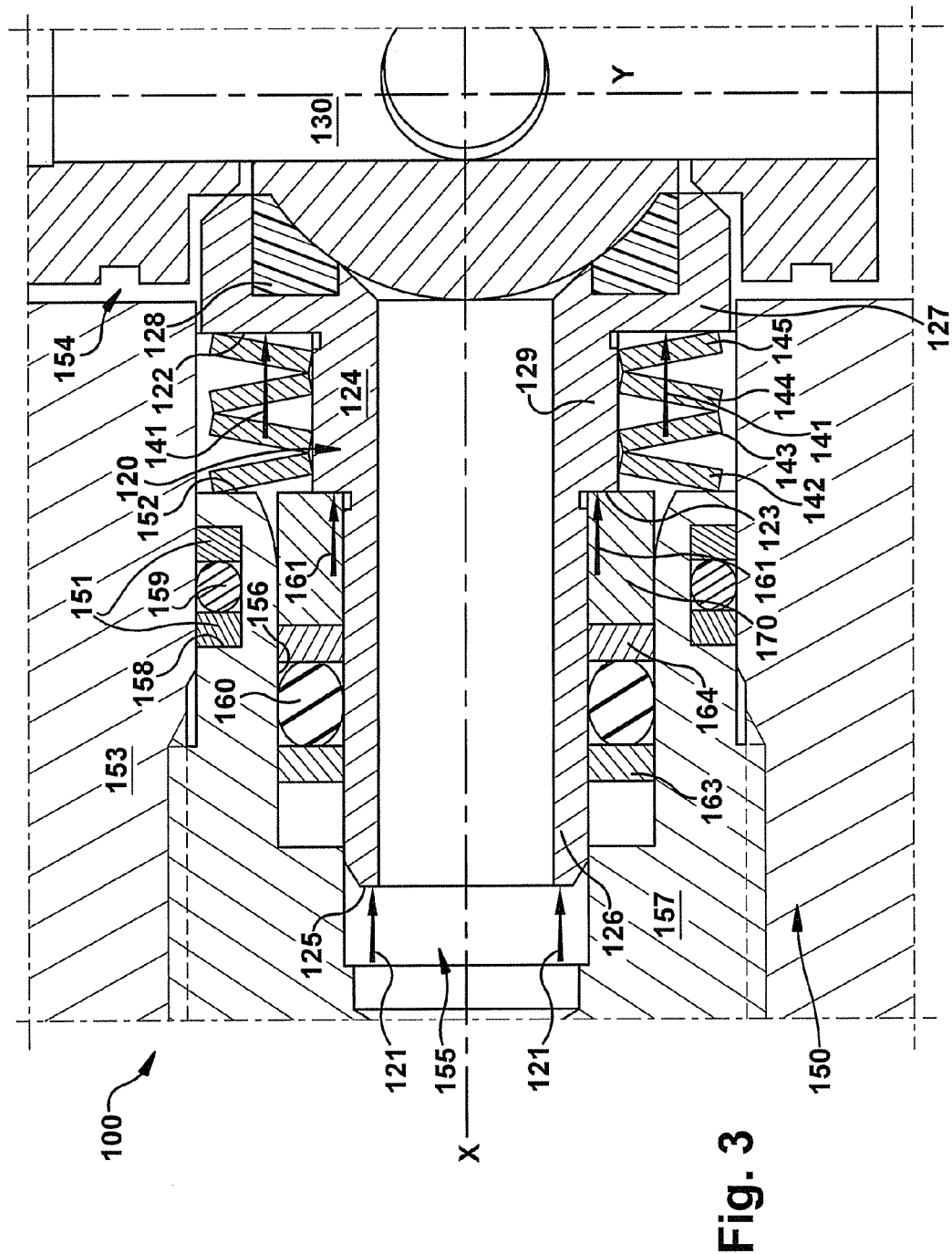
FIG. 3 is a partial cross-sectional view of a ball valve including a sealing arrangement similar to the sealing arrangement of the valve of FIG. 2B.

The inventive sealing arrangement of FIG. 2B may be provided in many different types of valve assemblies, including, for example, ball valves. FIG. 3 illustrates a partial cross-sectional view of an upstream or inlet side of one such exemplary shut-off ball valve 100. The valve 100 includes a seat member 120 axially movable within a fluid passage 155 (i.e., along central axis X of fluid passage 155) of a valve body 150 for sealing engagement against a rotatable valve element 130 (which, for example, may be consistent with the trunnion-style ball member of the '239 patent), shown in a closed or shut-off rotational position. The valve 100 may, but need not, be symmetrical with respect to a central axis Y of the valve element 130, such that a downstream portion substantially matches the upstream portion of the valve shown in the partial view of FIG. 3. While many different types of seat members may be utilized, the illustrated seat member 120 includes a seat carrier 124 having a proximal (i.e., proximal to the valve element) head portion 127 configured to carry (e.g., fixedly or loosely) a seat insert or seat ring 128 for sealing against the valve element 130, a medial shoulder portion 129 circumferentially stepped down from the head portion 127, and a distal tail portion 129 circumferentially stepped down from the shoulder portion 129. The valve element 130 and seat ring 128 may be provided, for example, with complementary shaped substantially spherical sealing surfaces.

The illustrated valve body 150 includes a central body member 153 which defines a valve cavity 154 for retaining the valve element, and an end fitting 157 assembled with the central body member 153 to define the fluid passage 155. As shown, the end fitting 157 may include an annular recess 158 sized to retain one or more end fitting seals 159 and backup rings 151 to provide a seal between the end fitting 157 and the body member 153. While FIG. 3 illustrates only a partial cross sectional view of the valve 100, in one embodiment, other components of the valve may be consistent with the trunnion-style ball valve of the '239 patent.

The exemplary seat member 120 is biased against the valve element 130 by disc springs 142, 143, 144, 145, which are compressed or live-loaded between a radially extending axially inner end face 152 of the end fitting 157 and an axially outer face or radially extending bearing surface 122 of the seat carrier head portion 127. The illustrated disc springs 142, 143, 144, 145 (which may be provided in any suitable quantity) exert a live-loaded sealing force (represented by arrows 141) directly against the bearing surface 122 to move or bias the seat member 120 towards sealing engagement with the valve element 130. In other embodiments, this live-loaded sealing force may be applied to the seat member through an intermediate component (not shown).

In the illustrated embodiment of FIG. 3, an annular fluid-driven seal member 160 (e.g., an o-ring seal) is radially disposed between the tail portion 126 of the seat carrier 124 and an internal surface 156 of the fluid passage 155 (disposed on the end fitting 157). The exemplary seal member 160 provides a seal between the seat member 120 and the valve body 150 (at the end fitting 157), such that pressurized fluid introduced into the fluid passage 155 does not apply a sealing force directly against the bearing surface 122 upon which the live-loaded disc springs 142, 143, 144, 145 are acting. Instead, in this embodiment, a direct fluid sealing force (represented by arrows 121) against the seat member 120 is limited to a radially extending end face 125 of the seat carrier tail portion 126 upstream of the seal member 160. As shown, backup rings 163, 164 may be provided on opposite sides of the seal member 160 to provide additional support for the seal member 160. The seal member 160 and back-up rings 163, 164 may be provided in any suitable material, such as, for example, an elastomeric or polymeric material.

While a fluid-driven force may be applied directly by a seal member against a seat member, in other embodiments, a fluid-driven force transmitting member (such as, for example, a gland member) may be included, such that axial movement of the seal member may result in a fluid-driven force applied to the seat member at or through the force transmitting member. The exemplary valve 100 is provided with an annular fluid-driven force transmitting gland member 170 disposed axially between the seal member 160 and the seat carrier head portion 127, and radially between the seat carrier tail portion 126 and an internal surface of the fluid passage 155 (in the end fitting 157). In this embodiment, the gland member 170 transmits a fluid-driven force 161 from the seal member 160 to a second radially extending bearing surface 123 on the seat carrier 124, located on an axially outer face of the medial shoulder portion 129 that is radially inward of, and axially spaced from, the first bearing surface 122. As a result, the gland member 170 does not transmit the fluid-driven force 161 against or through the disc springs 142-145, and the fluid-driven force 161 is isolated from the live-loaded sealing force 141, resulting in additive sealing forces for sealing the seat ring 128 against the valve element 130. The fluid-driven force transmitting member 170 may be provided in a rigid material, such as metal or plastic, for example, to limit extrusion of the o-ring 160 and backup rings 163, 164 and to better transmit sealing forces to the seat member 120.

The sealing surfaces between the valve element 130 and the seat ring 128, between the seat carrier 124 and the seal member 160, and between the seal member 160 and the end fitting 157 provide a fluid tight seal between the valve cavity 154 and the fluid passage 155. The fluid driven forces on the seat member 120 are determined by the differential pressure between the valve cavity 154 and the fluid passage 155. In a typical shut-off valve with opposed inlet and outlet fluid passages separated by a valve cavity, in the valve's closed condition, the fluid pressure within the inlet passage is greater than the fluid pressure within the valve cavity, and the fluid pressure within the outlet passage is less than the fluid pressure within the valve cavity.

When the fluid pressure within the fluid passage 155 exceeds the fluid pressure within the valve cavity 154, the fluid driven force on the seat member 120 will result from an unbalanced pressure load on the radially extending pressure-driven surfaces of the seat member within the fluid passage 155. In the embodiment of FIG. 3, the portion of the seal member 160 that extends radially outward of the innermost sealing portion of the seat ring 128 provides an unbalanced pressure load directed toward the valve element 130, thereby providing a pressure assisted sealing force, applied both directly to the seat carrier tail portion 126 and through the seal member 160 and force-transmitting member 170 to the second bearing surface 123. Because this pressure assisted sealing force does not act to compress the springs 142-145, the pressure assisted sealing force is independent of, or additive to, the live-loaded sealing force.

When the fluid pressure within the valve cavity 154 exceeds the fluid pressure within the fluid passage 155, the fluid driven force on the seat member 120 will result from an unbalanced pressure load on the radially extending pressure-driven surfaces of the seat member within the valve cavity 154. In the embodiment of FIG. 3, the portion of the seal member 160 that extends radially inward of the outermost sealing portion of the seat ring 128 provides an unbalanced pressure load directed toward the valve element 130, thereby providing a pressure assisted sealing force, applied directly to the second bearing surface 123. Because this pressure assisted sealing force does not act to compress the springs 142-145, the pressure assisted sealing force is independent of, or additive to, the live-loaded sealing force.

By adapting the seal member 160 to be axially unbounded by the seat member 120 in a direction away from the valve element 130, the seal member 160 contributes to the pressure assisted sealing forces within the fluid passage 155, but does not contribute to the pressure assisted sealing forces within the valve cavity 154. This allows unbalanced pressure loads in either the fluid passage 155 or the valve cavity 154 to provide a pressure assisted or fluid-driven sealing force to the seat member 120, depending on the portion of the valve 100 in which the excess fluid pressure is maintained.

Figure 4:
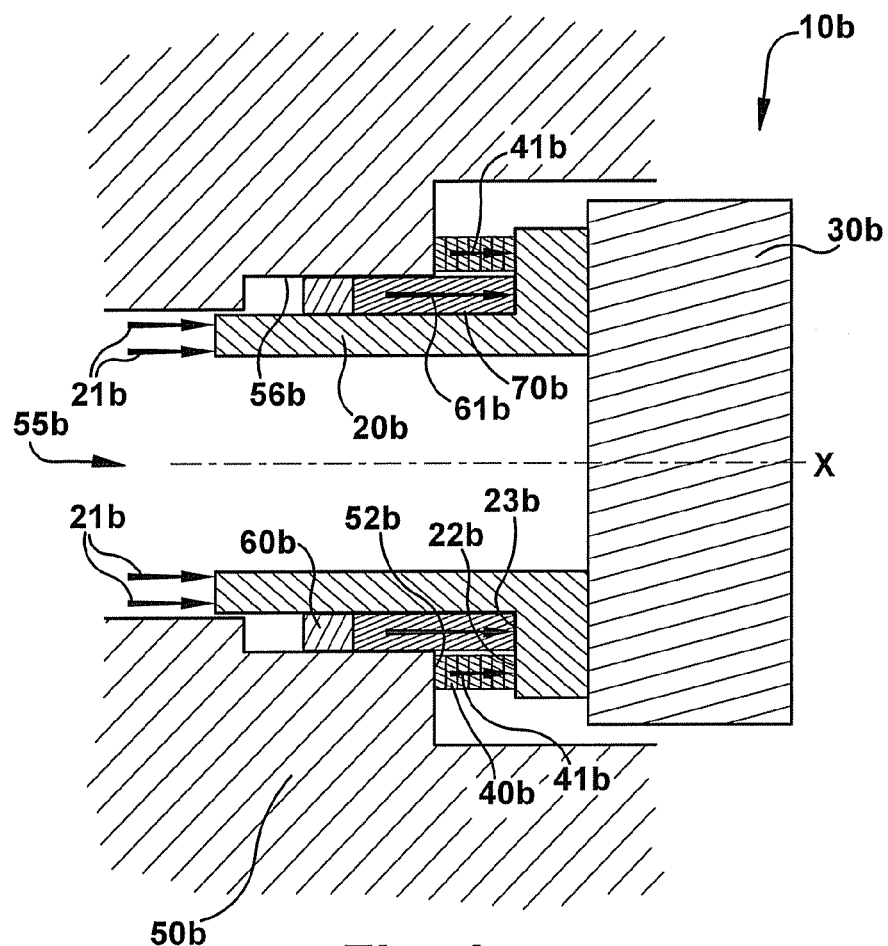
FIG. 4 is a partial cross-sectional schematic view of a valve having a live-loaded biasing member and a fluid-driven force transmitting member for applying sealing forces to radially spaced surfaces of a seat member.

Other configurations may be utilized to transmit or apply a fluid-driven force from a seal member (such as a sealing element) to a seat member while isolating the fluid-driven force from a live-loaded biasing member. In one embodiment, a fluid-driven force transmitting member may be configured to transmit a fluid-driven force from a seal member to a seat member bearing surface that is axially aligned with, but radially spaced or offset from, the bearing surface against which the live-loaded sealing force is applied, thereby allowing the fluid-driven force and the live-loaded sealing force to act against the seat member independently. As shown in FIG. 4, a valve 10b may be provided with an annular gland member 70b disposed axially between the seal member 60b and the seat member 20b, and radially between the seat member 20b and the live-loaded biasing member 40b. In this embodiment, the fluid-driven force transmitting member 70b transmits the fluid-driven force 61b from the seal member 60b to a second radially extending bearing surface 23b on the seat member 20b, located radially inward of, and coplanar with, the first bearing surface 22b.

Figure 5:
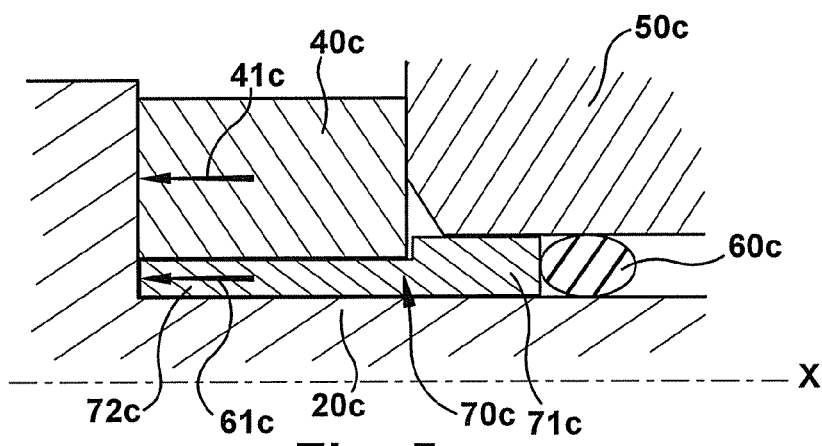
FIG. 5 is a partial cross-sectional schematic view of a valve sealing arrangement having a fluid-driven force transmitting member with a non-uniform radial thickness.

While the force transmitting member may comprise a gland member of uniform thickness, as shown, for example, in FIGS. 2B, 3, and 4, many other configurations of fluid-driven force transmitting members may be utilized to apply a fluid-driven force to a seat member independent of, or additive to, a live-loaded sealing force. For example, as shown in FIG. 5, a fluid-driven force transmitting gland member 70c may include a first end portion 71c having a larger outer diameter (greater radial thickness) for engaging, supporting, and/or retaining a seal member 60c, and a second end portion 72c having a smaller outer diameter (smaller radial thickness), for example, to accommodate a live-loaded biasing member 40c having a smaller inner diameter. This may allow for live-loaded biasing members (such as, for example, disc springs) having greater radial thicknesses to provide an increased live-loaded sealing force 41c.

Figure 6:
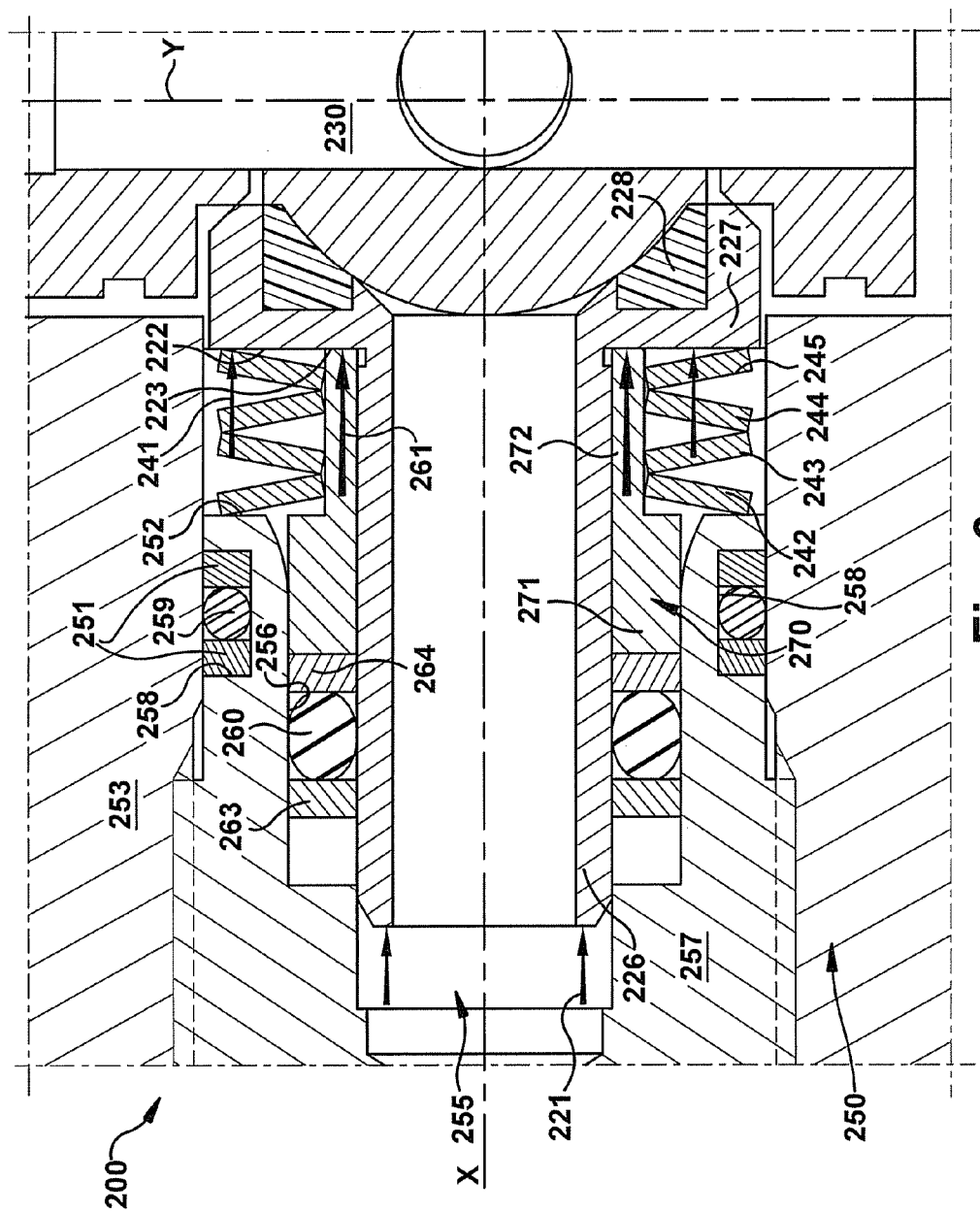
FIG. 6 is a partial cross-sectional view of a ball valve including a sealing arrangement similar to the sealing arrangement of the valve of FIG. 5.

FIG. 6 illustrates a partial cross-sectional view of an upstream or inlet side of an exemplary shut-off ball valve 200, similar to the ball valve 100 of FIG. 3, but with a sealing arrangement configured to apply live-loaded and fluid-driven forces independently to coplanar bearing surfaces 222, 223 of the seat member 220. The exemplary valve 200 is provided with an annular fluid-driven force transmitting gland member 270 disposed axially between the seal member 260 and the seat carrier head portion 227, and radially between the seat carrier tail portion 226 and an internal surface of the fluid passage 255 (both in the end fitting 257 and the central body member 256). In this embodiment, the gland member 270 includes a first end portion 271 having a larger outer diameter for supporting the seal member 260 (indirectly through backup ring 264). The gland member 270 includes a second end portion 272 having a smaller outer diameter to allow the gland member 270 to extend beyond the end fitting 257 radially inward of the disc springs 242, 243, 244, 245 to engage a second radially extending bearing surface 223 on the seat carrier head portion 227, coplanar with the first bearing surface 222 against which the disc springs 242-245 are compressed. When pressurized fluid is applied to the fluid passage 255, the gland member 270 transmits a fluid-driven force 261 from the seal member 260 to the seat member 220. The gland member 270 does not transmit the fluid-driven force 261 against or through the disc springs 242-245, and the fluid-driven force 261 is isolated from the live-loaded sealing force 241, resulting in additive sealing forces for sealing the seat ring 228 against the valve element 230. The exemplary gland member 270 may be further dimensioned such that the wider first end portion 271 does not engage the axially outermost disc spring 242 regardless of fluid pressure applied, such that the fluid-driven force 261 remains isolated from the live-loaded sealing force 241.

Figure 7:
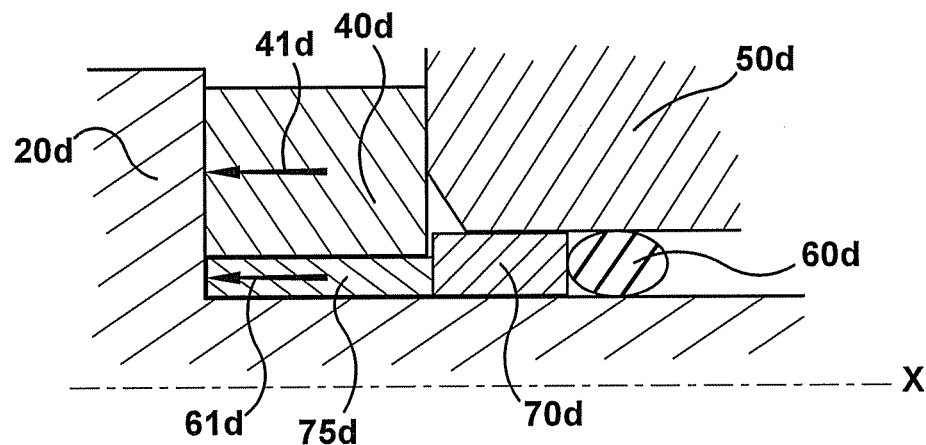
FIG. 7 is a partial cross-sectional schematic view of a valve sealing arrangement having a two piece fluid-driven force transmitting member.
Figure 8:
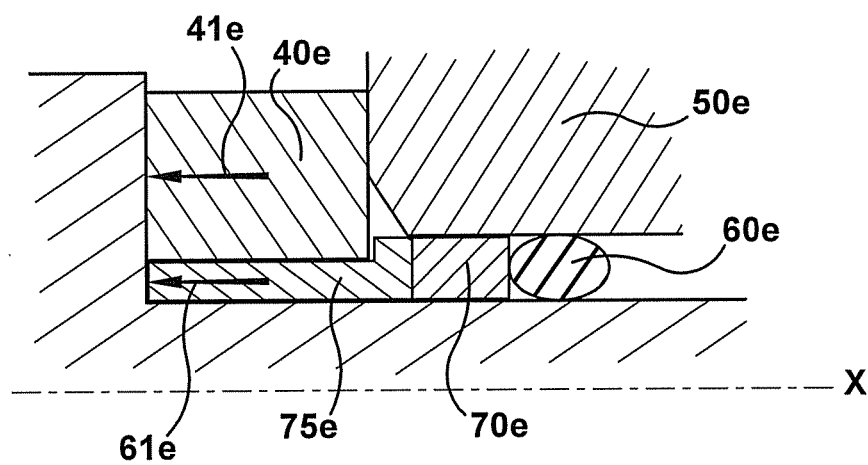
FIG. 8 is a partial cross-sectional schematic view of another valve sealing arrangement having a two piece fluid-driven force transmitting member.

While the force transmitting member may comprise a single gland member, as shown and described above, a fluid-driven force transmitting member may also include multiple components, such as stacked first and second gland members 70d, 75d, 70e, 75e as shown in FIGS. 7 and 8. As shown, these gland members may, but need not, be provided with varying radial thicknesses, for example, to accommodate different sized live-loaded biasing members 40d, 40e, or to support different sized seal members 60d, 60e.

Figure 9:
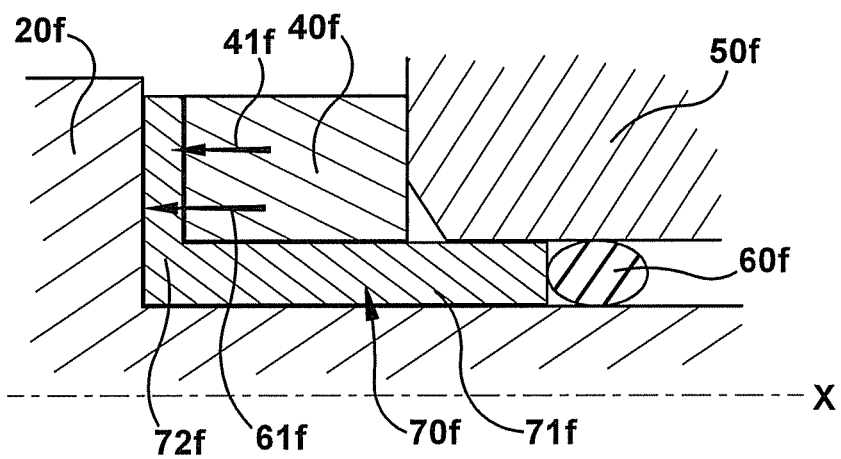
FIG. 9 is a partial cross-sectional schematic view of a valve sealing arrangement having a fluid-driven force transmitting member configured to transmit a live-loaded sealing force from a live-loaded biasing member to a seat member.
Figure 10:
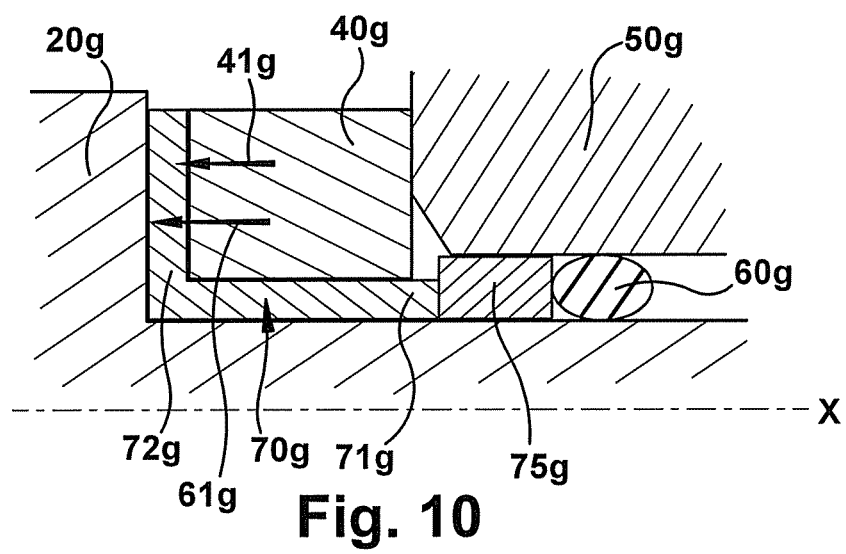
FIG. 10 is a partial cross-sectional schematic view of a valve sealing arrangement having a two piece fluid-driven force transmitting member configured to transmit a live-loaded sealing force from a live-loaded biasing member to a seat member.

In yet another embodiment, a fluid-driven force transmitting member may be configured to include a live-loaded biasing member bearing surface, such that the live-loaded sealing force is transmitted through the fluid-driven force transmitting member, while still providing a fluid-driven force that is in parallel with the live-loaded sealing force. As shown in FIG. 9, a fluid-driven force transmitting gland member 70f may include a first end portion 71f having a smaller outer diameter (smaller radial thickness) for extending through a live-loaded biasing member 40f (such as, for example, one or more disc springs) to engage, support, and/or retain a seal member 60f, and a second end portion 72f having a larger outer diameter (greater radial thickness) to apply a fluid-driven force 61f to a seat member bearing surface 23f and to bear against the live-loaded biasing member 40f. Because the fluid-driven force 61f is not applied through or against the live-loaded biasing member 40f, the fluid-driven force 61f is independent of or in parallel with a live-loaded sealing force 41f applied by the live-loaded biasing member 40f. This configuration may, for example, allow for pre-assembly of a gland-spring subassembly to be installed in the valve. The fluid-driven force transmitting member may be provided as a single gland member 70f, as shown in FIG. 9, or as multiple stacked gland members 70g, 75g (or other such components), as shown in FIG. 10.

Still other configurations may be utilized to transmit or apply a fluid-driven force from a seal member (such as a sealing element) to a seat member while isolating the fluid-driven force from a live-loaded biasing member. In one embodiment, a sealing arrangement may be configured to transmit a fluid-driven force from a seal member to a seat member bearing surface that is axially spaced or offset from, but at least partially radially aligned with, the bearing surface against which the live-loaded sealing force is applied, thereby allowing the fluid-driven force and the live-loaded sealing force to act against the seat member independently. For example, one of the bearing surfaces may be provided on a flange portion extending radially from an outer peripheral wall of the seat member. In one such embodiment, this arrangement may allow for the use of a live-loaded biasing member having a smaller inner diameter and greater radial thickness, to provide a greater live-loaded sealing force.

Figure 11:
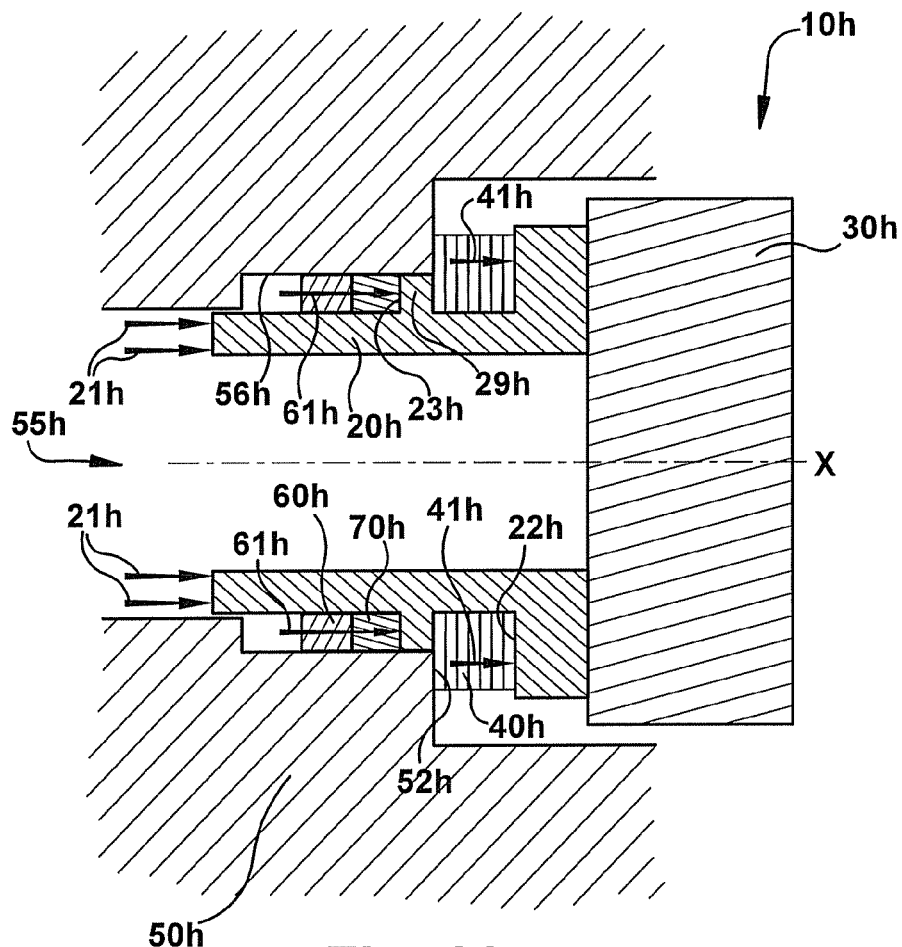
FIG. 11 is a partial cross-sectional schematic view of a valve sealing arrangement having a seat member with a radially extending bearing flange.

As shown in FIG. 11, a valve 10h may be provided with an annular gland member 70h disposed axially between the seal member 60h and the seat member 20h. In this embodiment, the fluid-driven force transmitting member 70h transmits the fluid-driven force 61h from the seal member 60h to a second radially extending bearing surface 23h on the seat member 20h, located on a flange 29h that extends radially from an outer peripheral wall of the seat member, and is axially spaced from the first bearing surface 22h. By providing the second bearing surface 23h on a radially extending flange 29h of the seat member 20h, the first and second bearing surfaces 22h, 23h may (but need not) be at least partially radially aligned. This exemplary arrangement may also allow for use of a live-loaded biasing member 40h (such as, for example, one or more disc springs) having a smaller inner diameter and therefore a greater live-loaded sealing force for biasing the seat member 20h towards sealing engagement with the valve element.

Figure 12:
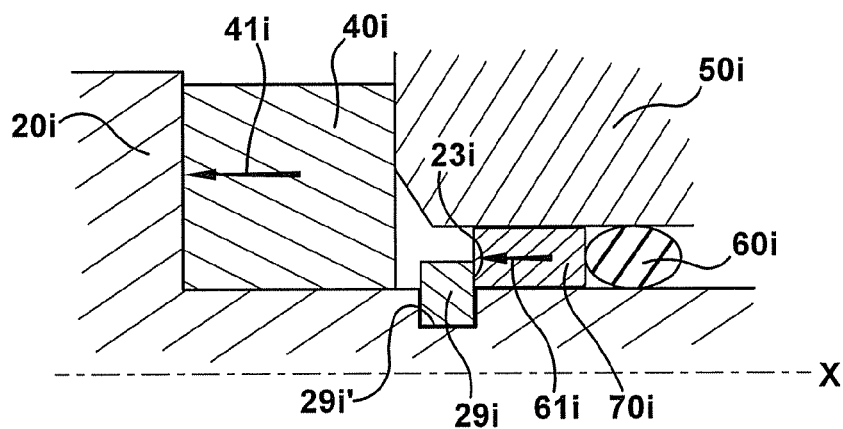
FIG. 12 is a partial cross-sectional schematic view of a valve sealing arrangement having a seat member with a spring clip retained in an annular groove of the seat member.
Figure 13:
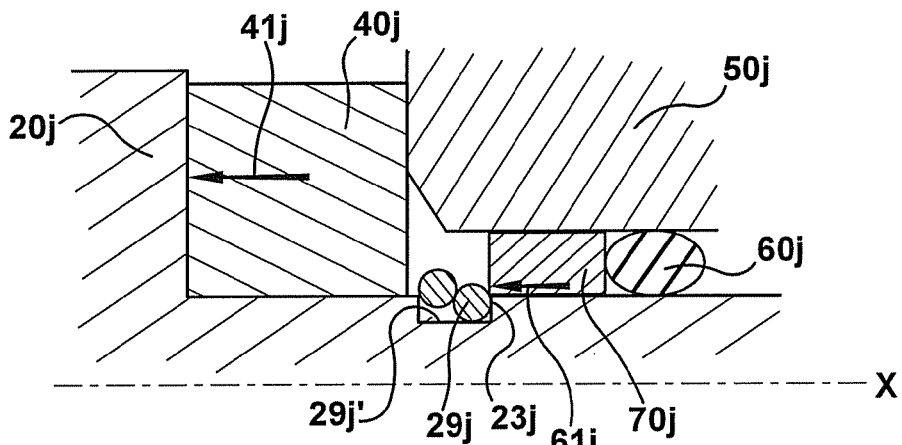
FIG. 13 is a partial cross-sectional schematic view of a valve sealing arrangement having a seat member with a wound wire spring clip retained in an annular groove of the seat member.

While a bearing flange may be provided as an integral radial extension from an axially extending wall of a seat member, as schematically shown in FIG. 11, in other embodiments, a flange component may be assembled with a seat carrier or other such seat component to provide a bearing surface. This may allow for installation of an annular live-loaded biasing member (such as one or more disc springs) having an inner diameter that is smaller than the outer diameter of the flange component, as the live-loaded biasing member may be installed on or assembled with the seat member before assembling the flange component with the seat member. Various components may be utilized to form a flange portion on a seat member, including, for example, a spring clip or split ring gland, which may, for example, be retained in an annular groove in the seat member. For example, as shown in FIG. 12, a spring clip 29i may be securely retained in an annular groove 29i' of a seat member 20i, to provide a bearing surface 23i against which a fluid-driven force transmitting member 70i may be biased to apply a fluid-driven force 61i to the seat member 20i. As another example, a double wound wire spring clip 29j may be wrapped around and retained in an annular groove 29j' of a seat member 20j, to provide a bearing surface 23j, as shown in FIG. 13.

Figure 14:
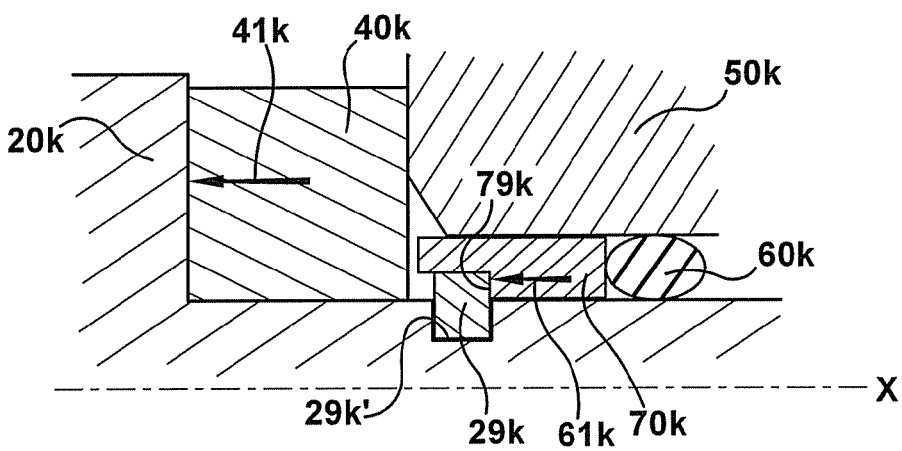
FIG. 14 is a partial cross-sectional schematic view of a valve sealing arrangement having a fluid-driven force transmitting member with a counter-bore configured to assist in retaining a spring clip in an annular groove of a seat member.
Figure 15:
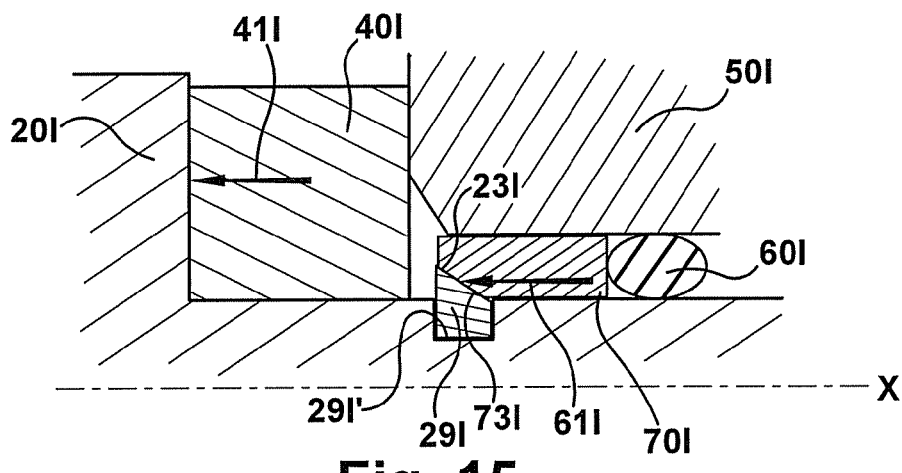
FIG. 15 is a partial cross-sectional schematic view of a valve sealing arrangement having a fluid-driven force transmitting member and a split ring with complementary shaped tapered surfaces configured to assist in retaining the split ring in an annular groove of a seat member.

While a fluid-driven force transmitting member may be provided as a gland of uniform thickness, in other embodiments, a gland may be shaped or contoured, for example, to assist in retaining the flange component on the seat member. For example, as shown in FIG. 14, a fluid-driven force transmitting gland member 70k may include a counter-bore 79k sized to receive an exposed end of a spring clip flange component 29k, to assist in preventing the spring clip 29k from being dislodged from the groove 29k'. As another example (shown in FIG. 15), a fluid-driven force transmitting gland member 70l and a split ring flange component 29l may be provided with complementary shaped tapered surfaces 73l, 23l (which may be of varying angles and/or contours), such that as a fluid-driven force 61l is applied to the split ring 29l by the gland member 70l, the gland member 70l energizes the capture of the split ring 29l within the groove 29l'.

Other arrangements may be utilized to provide a seat member bearing surface that is axially spaced or offset from, but at least partially radially aligned with, the bearing surface against which the live-loaded sealing force is applied, while still allowing for assembly of an annular live-loaded biasing member with the seat member. For example, as shown in FIG. 16, a threaded flange member 29m may be threaded onto a corresponding threaded portion of the seat member 20m after installation of the live-loaded biasing member 40m on the seat member 20m. Other means of attaching a flange member to the seat member may also be utilized, including, for example, welding. As another example (shown in FIG. 17), a seat head portion 20n' may be assembled with a base portion of the seat member 20n after installation of the live-loaded biasing member 40n on the base portion. While the seat member assembly 20n is shown as a threaded arrangement, other means of attaching the head portion to the base portion may be utilized, including, for example, welding, diffusion bonding, and adhesives.

Figure 18A:
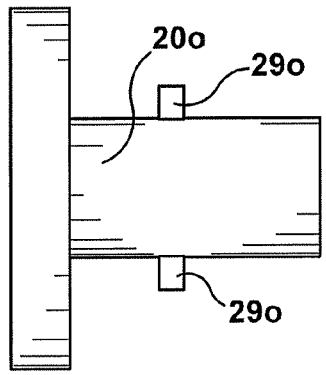
FIG. 18A is a schematic side view of a seat member having seal bearing tangs.
Figure 18B:
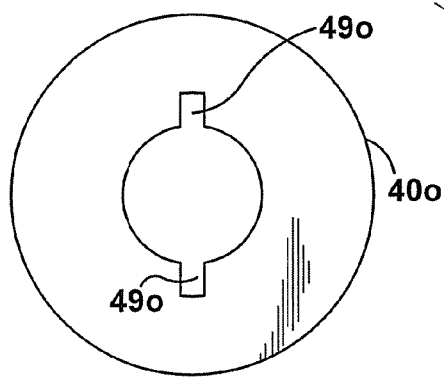
FIG. 18B is a schematic end view of a spring member having a keyed cutout portion configured to slide past the seal bearing tangs of the seat member of FIG. 18A during valve assembly.
Figure 18C:
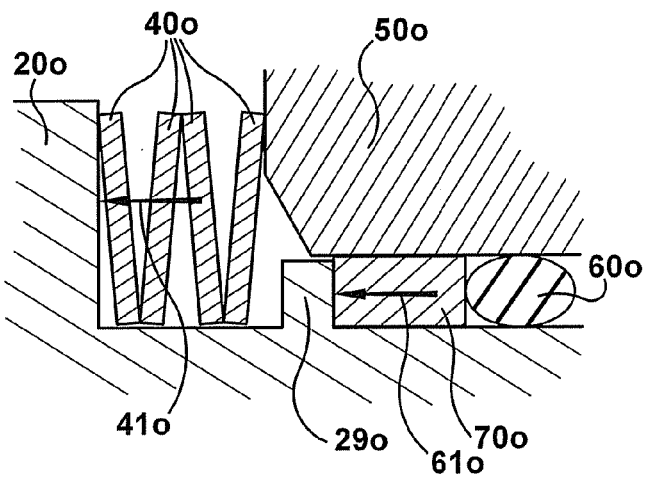
FIG. 18C is a partial cross-sectional schematic view of a valve sealing arrangement having a seat member consistent with the seat member of FIG. 18A, and spring members consistent with the spring member of FIG. 18B.
Figure 19A:
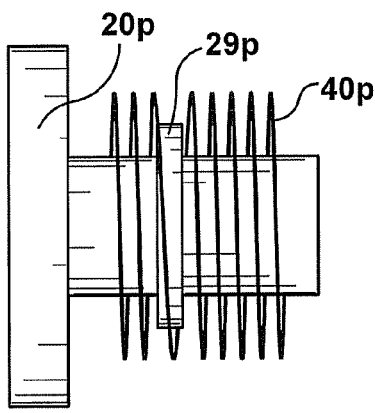
FIG. 19A is a schematic side view of a spring member partially assembled with a seat member.
Figure 19B:
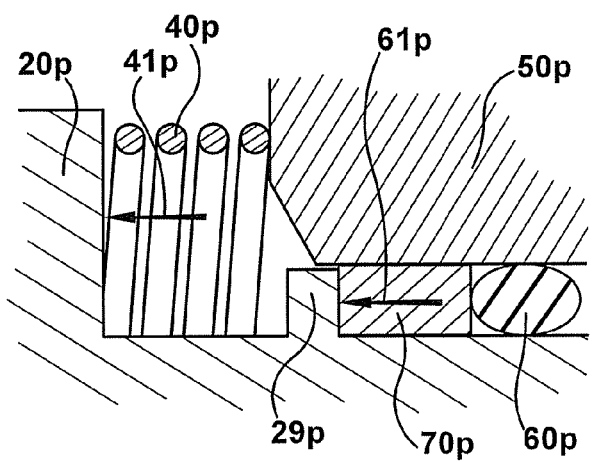
FIG. 19B is a partial cross-sectional schematic view of a valve sealing arrangement having a seat member and spring member consistent with the seat member and spring member of FIG. 19A.

In other embodiments, one or both of a live-loaded biasing member and a flange portion of a seat member may be configured to allow installation of the live-loaded biasing member on the seat member between the flange portion and a head portion of the seat member. For example, as shown in FIGS. 18A-18C, a live-loaded biasing member may include one or more disc springs 40o having cutout portions 49o sized to pass over corresponding flange tangs 29o of a seat member 20o. Upon installation, the disc springs 40o may be rotated to misalign the cutouts 49o with the tangs 29o to retain the springs 40o on the seat member 20o. As another example (shown in FIGS. 19A and 19B), a live-loaded biasing member may include a coil spring 40p that may be wrapped or threaded past a flange portion 29p of a seat member 20p. Many other types of spring members may be utilized for assembly between a head portion and a flange portion of a seat member, such as, for example, helical spring washers.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

What is claimed is:
1. A valve comprising:
a valve body comprising a valve cavity and a fluid passage;
a valve element at least partially disposed in the valve cavity to selectively control flow through the fluid passage;
a seat member at least partially disposed in the fluid passage, the seat member being axially movable along the fluid passage to seal against a sealing surface of the valve element;
a seal member disposed between the seat member and the valve body, the seal member and seat member together providing a fluid-tight seal between the valve cavity and the fluid passage; and
a live-loaded biasing member adapted to apply a live-loaded sealing force to the seat member to bias the seat member toward sealing engagement with the valve element;
the live-loaded biasing member being adapted to apply the live-loaded sealing force to a first bearing surface of the seat member, and the seal member is adapted to apply at least a portion of the unbalanced passage pressure load to a second bearing surface of the seat member, the second bearing surface being separate from the first bearing surface;
the seal member is configured to apply the portion of the unbalanced passage pressure load to the first bearing surface through first and second force transmitting members axially disposed between the seal member and the first bearing surface;
the first force transmitting member is provided with a first radial thickness sized to support the seal member, and the second force transmitting member is provided with a second radial thickness sized to accommodate assembly with the live-loaded biasing member;
wherein when pressure in the fluid passage exceeds pressure in the valve cavity, an unbalanced passage pressure load biases the seat member toward sealing engagement with the valve element, and when the pressure in the valve cavity exceeds the pressure in the fluid passage, an unbalanced cavity pressure load biases the seat member toward sealing engagement with the valve element, the live-loaded sealing force being in parallel with each of the unbalanced passage pressure load and the unbalanced cavity pressure load.

2. The valve of claim 1, wherein the first bearing surface is axially spaced from the second bearing surface.

3. The valve of claim 1, wherein the first bearing surface is radially spaced from the second bearing surface.

4. The valve of claim 1, wherein the first and second bearing surfaces are coplanar.

5. The valve of claim 1, wherein the first and second bearing surfaces are at least partially radially aligned.

6. The valve of claim 1, wherein the live-loaded biasing member is axially disposed between the seal member and the valve element.

7. The valve of claim 1, wherein the seal member is axially unbounded by the seat member in a direction away from the valve element.

8. The valve of claim 1, wherein the live-loaded sealing force is isolated from the unbalanced passage pressure load.

* * * * *